US011000951B2

(12) United States Patent
Van Schoyck et al.

(10) Patent No.: US 11,000,951 B2
(45) Date of Patent: May 11, 2021

(54) ROBOTIC STAIR LIFTS

(71) Applicant: QUALCOMM Incorporated, San Diego, CA (US)

(72) Inventors: Travis Van Schoyck, Princeton, NJ (US); Matthew Hyatt Turpin, Philadelphia, PA (US); Rizwan Ahmed, Haddonfield, NJ (US); Stephen Marc Chaves, Philadelphia, PA (US); Ross Eric Kessler, Philadelphia, PA (US); Paul Daniel Martin, Philadelphia, PA (US); Michael Joshua Shomin, Philadelphia, PA (US); Moussa Ben Coulibaly, Brookhaven, PA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 16/005,395

(22) Filed: Jun. 11, 2018

(65) Prior Publication Data
US 2019/0375107 A1 Dec. 12, 2019

(51) Int. Cl.
*B25J 9/16* (2006.01)
(52) U.S. Cl.
CPC ........... *B25J 9/1694* (2013.01); *B25J 9/1664* (2013.01)

(58) Field of Classification Search
CPC ..... B25J 9/1694; B25J 9/1664; G05D 1/0219; G05D 1/0246; G05D 2201/0203; Y10S 901/01
See application file for complete search history.

(56) References Cited

U.S. PATENT DOCUMENTS

| 10,395,504 B1 * | 8/2019 | Hutz | G08B 13/196 |
| 10,769,926 B1 * | 9/2020 | Rogers | G08B 21/0461 |
| 2016/0268805 A1 * | 9/2016 | Finn | H02J 7/35 |
| 2019/0248007 A1 * | 8/2019 | Duffy | B25J 9/08 |

* cited by examiner

*Primary Examiner* — Dale Moyer
(74) *Attorney, Agent, or Firm* — Holland & Hart LLP

(57) ABSTRACT

Methods, systems, and devices for robotic navigation are described. A robotic device such as a robotic vacuum or a robotic assistant may navigate a first surface. In some cases, navigating the first surface may include removing debris from the first surface. The robotic device may identify a location of a track that connects the first surface to a second surface that is vertically displaced from the first surface. The robotic device may engage the track based at least in part on the identified location. The robotic device may ascend to the second surface by activating an actuator and navigate the second surface (e.g., may remove debris from the second surface, may map the second surface, etc.).

20 Claims, 9 Drawing Sheets

ROBOTIC STAIR LIFTS

BACKGROUND

The following relates generally to robotic navigation, and more specifically to robotic stair lifts.

Robotic devices have become increasingly commonplace for performing various tasks in a semi-autonomous or autonomous manner. Such robotic devices may be embodied in a variety of forms and used in a variety of applications, such as in automated vacuum cleaners, unmanned aerial vehicles, terrestrial vehicle, etc. Applications for which robotic devices may be employed may include entertainment applications (e.g., toy robots), utility applications in environments that are unfriendly to humans (e.g., space, deep water, cold temperature, radiation, chemical exposure, biohazards, etc.), dangerous tasks (e.g., defusing of explosives), operation in confined spaces (e.g., collapsed buildings), performance of menial tasks (e.g., cleaning), etc.

SUMMARY

The described techniques relate to improved methods, systems, devices, and apparatuses that support robotic stair lifts. Generally, the described techniques provide for a robotic device engaging and utilizing a track that connects a first surface to a second surface that is vertically displaced from the first surface. Robotic devices may operate in a ground-based manner such that the robotic devices navigate surfaces through horizontal movement (e.g., along a plane defined by a first surface). Some operating environments may include one or more surfaces that are vertically displaced from the first surface (e.g., floors of a home that are separated by a staircase) and thus are inaccessible to robotic devices operating on the first surface due to the mobility characteristics of the robotic devices. Aspects of the present disclosure relate to robotic devices engaging and utilizing a track to move between such vertically displaced surfaces. For example, a robotic device navigating a first surface of an operating environment may identify a location of a track that connects the first surface to a second surface that is vertically displaced from the first surface and engage the track based on the identified location. The robotic device may ascend to the second surface and begin navigating the second surface according to the functionality of the robotic device.

A method of navigation at a device is described. The method may include navigating a first surface, identifying a location of a track that connects the first surface to a second surface that is vertically displaced from the first surface, engaging the track based on the identified location, ascending to the second surface by activating an actuator of the device, and navigating the second surface.

An apparatus for navigation is described. The apparatus may include a processor, memory in electronic communication with the processor, and instructions stored in the memory. The instructions may be executable by the processor to cause the apparatus to navigate a first surface, identify a location of a track that connects the first surface to a second surface that is vertically displaced from the first surface, engage the track based on the identified location, ascend to the second surface by activating an actuator of the device, and navigate the second surface.

Another apparatus for navigation is described. The apparatus may include means for navigating a first surface, identifying a location of a track that connects the first surface to a second surface that is vertically displaced from the first surface, engaging the track based on the identified location, ascending to the second surface by activating an actuator of the device, and navigating the second surface.

A non-transitory computer-readable medium storing code for navigation at a device is described. The code may include instructions executable by a processor to navigate a first surface, identify a location of a track that connects the first surface to a second surface that is vertically displaced from the first surface, engage the track based on the identified location, ascend to the second surface by activating an actuator of the device, and navigate the second surface.

In some examples of the method, apparatuses, and non-transitory computer-readable medium described herein, identifying the location of the track may include operations, features, means, or instructions for detecting the location of the track using one or more sensors of the device.

In some examples of the method, apparatuses, and non-transitory computer-readable medium described herein, the one or more sensors of the device include infrared beacons.

Some examples of the method, apparatuses, and non-transitory computer-readable medium described herein may further include operations, features, means, or instructions for mapping the first surface, the second surface, or both using the one or more sensors.

In some examples of the method, apparatuses, and non-transitory computer-readable medium described herein, identifying the location of the track may include operations, features, means, or instructions for determining a position of the device on the first surface and identifying the location of the track relative to the position of the device.

In some examples of the method, apparatuses, and non-transitory computer-readable medium described herein, navigating the first surface may include operations, features, means, or instructions for removing debris from the first surface.

Some examples of the method, apparatuses, and non-transitory computer-readable medium described herein may further include operations, features, means, or instructions for ascending to the third surface by activating the actuator of the device.

In some examples of the method, apparatuses, and non-transitory computer-readable medium described herein, the actuator includes an electronic actuator, a hydraulic fluid actuator, or a pneumatic actuator.

In some examples of the method, apparatuses, and non-transitory computer-readable medium described herein, engaging the track may include operations, features, means, or instructions for engaging a funneling system that guides the device to the track.

DETAILED DESCRIPTION

The described techniques relate to robotic stair lifts. Robotic devices that operate in a ground-based manner (e.g., robotic vacuums) may experience mobility issues when operating in environments that include one or more surfaces that are vertically displaced from each other (e.g., steps in a staircase or floors separated by a staircase). For example, a robotic device may not be able to access different floors of a home that are separated by a staircase. In such cases, the functionality of the robotic device may be limited by the inability to access different surfaces of an operating environment.

In accordance with aspects of the present disclosure, a robotic device may identify a location of a track that connects a first surface to a second surface that is vertically displaced from the first surface. For example, identifying the location of the track may be based on sensors (e.g., infrared sensors) of the robotic device or may be based on pre-configured location information. The robotic device may engage the track based on the identified location. The robotic device may ascend to the second surface by activating an actuator (e.g., an electronic actuator, a hydraulic fluid actuator, a pneumatic actuator) of the robotic device. Upon accessing the second surface, the robotic device may navigate the second surface and operate according to the functionality of the robotic device.

Aspects of the disclosure are initially described in the context of an operating environment. Aspects of the disclosure are then described in the context of a track and example diagrams of a robotic device. Aspects of the disclosure are further illustrated by and described with reference to apparatus diagrams, system diagrams, and flowcharts that relate to robotic stair lifts.

Figure 1:
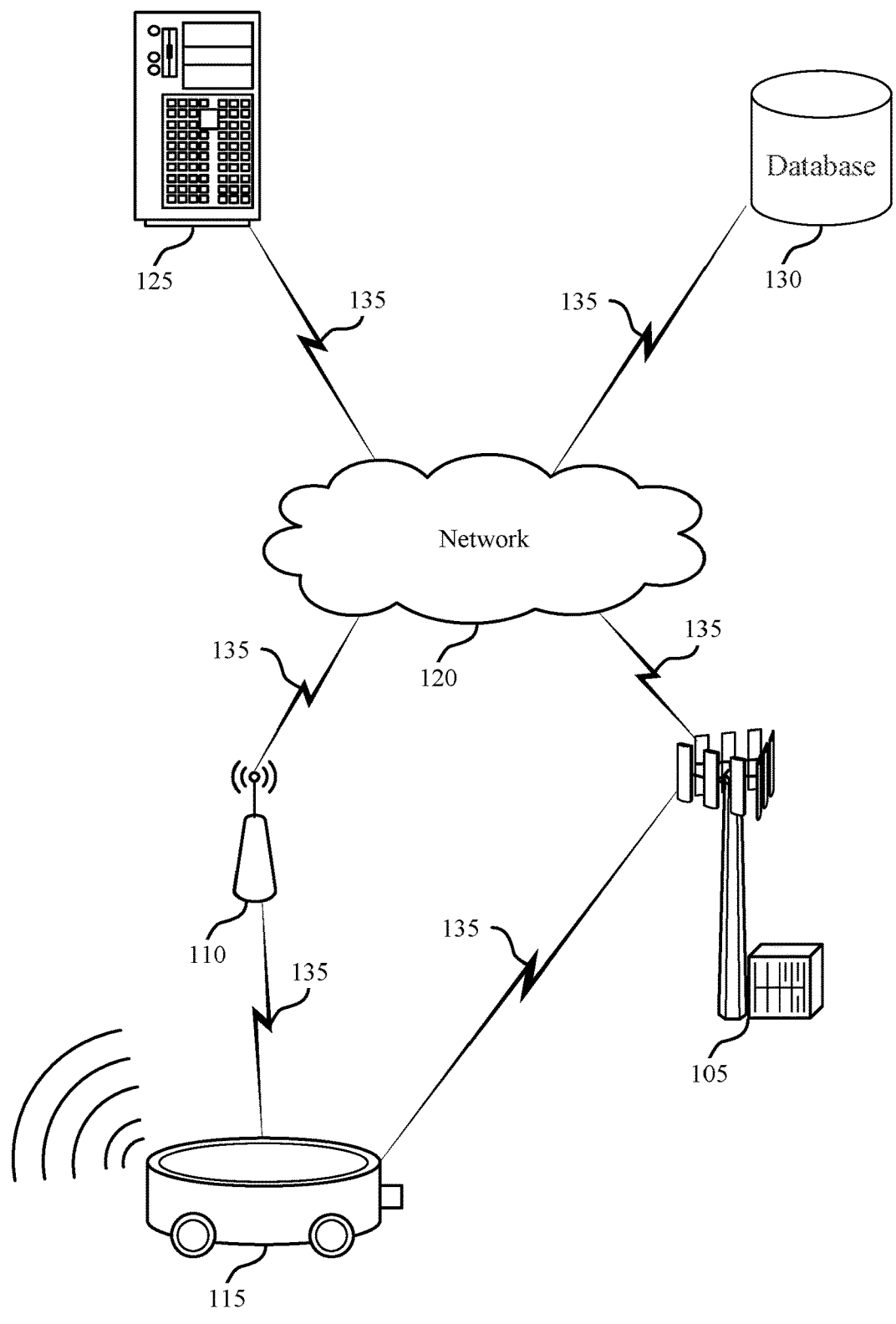
FIG. 1 illustrates an example of a system that supports robotic stair lifts in accordance with aspects of the present disclosure.

FIG. 1 illustrates an example of a system 100 that supports a robotic device 115 operating in coordination with a robotic stair lift in accordance with aspects of the present disclosure. The term "robotic device" may be used herein to describe one of various types of robotic vehicles, robotic appliances, robots, etc. including an onboard processing device configured to provide some autonomous or semi-autonomous capabilities. Examples of robotic devices include aerial vehicles, such as an unmanned aerial vehicle (UAV), ground vehicles and robots (e.g., autonomous or semi-autonomous cars, vacuum robots, search and rescue robots, bomb detection and disarming robots, etc.), water-based vehicles (i.e., surface watercraft and submarines), space-based vehicles (e.g., a spacecraft or space probe), or some combination thereof. In some examples, the robotic device 115 may be manned. In other examples, the robotic device 115 may be unmanned.

In examples in which the robotic device 115 is autonomous, the robotic device 115 may include an onboard processing device configured to maneuver and/or navigate the robotic device 115 without remote operating instructions (i.e., autonomously), such as from a human operator (e.g., via a remote computing device). In examples in which the robotic device 115 is semi-autonomous, the robotic device 115 may include an onboard processing device configured to receive some information or instructions, such as from a human operator (e.g., via a remote computing device) and autonomously maneuver the robotic device 115 in accordance with the received information or instructions.

The term "position" may be used herein to describe a location and an orientation of the robotic device 115 within a geo-boundary. In an example in which the robotic device 115 navigates in two-dimensions (2D), such as along the surface of a floor, the position of the robotic device 115 may be specified by a 2D position (x,y) and a heading (θ). In some embodiments, the robotic device 115 may employ simultaneous localization and mapping (SLAM) techniques to construct and update a map of an environment and geo-boundary associated with the environment, while simultaneously keeping track of its position within the environment and relative to the geo-boundary. A geo-boundary may correspond to a premises and define a 2D or 3D spatial boundary associated with the environment. For example, an environment may be a premises including a home, and the geo-boundary may correspond to certain zones (e.g., rooms) of the home that the robotic device 115 is allowed to perform autonomous functions while other zones may be restricted (e.g., rooms where the robotic device 115 is not allowed to perform autonomous functions).

The system 100 may support the robotic device 115 with a robotic stair lift. In some examples, the robotic device 115 may be configured to perform an autonomous debris collection process. For example, the robotic device 115 may act as a vacuum. The robotic device 115 may be configured to move between surfaces within a 3D geo-boundary in conjunction with a robotic stair lift. For example, the robotic device 115 may identify a location of the lift, engage the lift, and move between surfaces within the 3D geo-boundary. While aspects of the present disclosure are described in the context of robotic device 115 ascending from a first surface to a second surface, it is to be understood that in some cases robotic device 115 may additionally or alternatively descend from the second surface to the first surface. In some cases, the descent may be gravity-assisted or otherwise associated with lower power requirements.

In some examples, the robotic device 115 may employ various mechanisms and algorithms for determining a path within a geo-boundary to navigate to a designated area (e.g., a track location). The designated area may be user-defined (e.g., pre-configured) and/or identified by the robotic device 115 using sensory data related to the environment. After identifying the location, the robotic device 115 may move to a different surface (e.g., ascend or descend the track) and resume its operation. The robotic device 115 may also be capable of generating and transmitting a notification message indicating its location, such that an individual may locate the robotic device 115.

The system 100 may also include a base station 105, an access point 110, a server 125, and a database 130. The server 125 may include any combination of a data server, a cloud server, a server associated with an automation service provider, proxy server, mail server, web server, application server, database server, communications server, home server, mobile server, or any combination thereof. For example, the robotic device 115 may upload data (e.g., notifications) to an application hosted by the server 125 for posting data related to autonomous functions performed by the robotic device 115. For example, a user may be able to view the data posted by the robotic device 115 via an application running on a personnel wireless device to review functions performed by the device 115. The server 125 may also transmit to the robotic device 115 a variety of information, such as navigation information, movement control instructions, and other information, instructions, or commands relevant to autonomous operations of the robotic device 115.

The database 130 may store data that may include navigation information, movement control instructions, and other information, instructions, or commands (e.g., track locations, occupancy data, administrator preferences) relevant to autonomous operations of the robotic device 115. The robotic device 115 may retrieve the stored data from the database via the base station 105 and/or the access point 110.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)) for example), etc. Network 120 may include the Internet.

The base station 105 may wirelessly communicate with the robotic device 115 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The robotic device 115 described herein may be able to communicate with various types of base stations and network equipment including macro eNBs, small cell eNBs, gNBs, relay base stations, and the like. The access point 110 may be configured to provide wireless communications for the robotic device 115 over a relatively smaller area compared to the base station 105.

In some cases, the robotic device 115 may also be able to communicate directly with another device (e.g., using a peer-to-peer (P2P) or device-to-device (D2D) protocol) such as: a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The wireless communication links 135 shown in the system 100 may include uplink (UL) transmissions from the robotic device 115 to the base station 105, the access point 110, or the server 125, and/or downlink (DL) transmissions, from the base station 105, the access point 110, or the server 125 to the robotic device 115. The downlink transmissions may also be called forward link transmissions while the uplink transmissions may also be called reverse link transmissions. The wireless communication links 135 may transmit bidirectional communications and/or unidirectional communications. Wireless communication links 135 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems.

Figure 2:
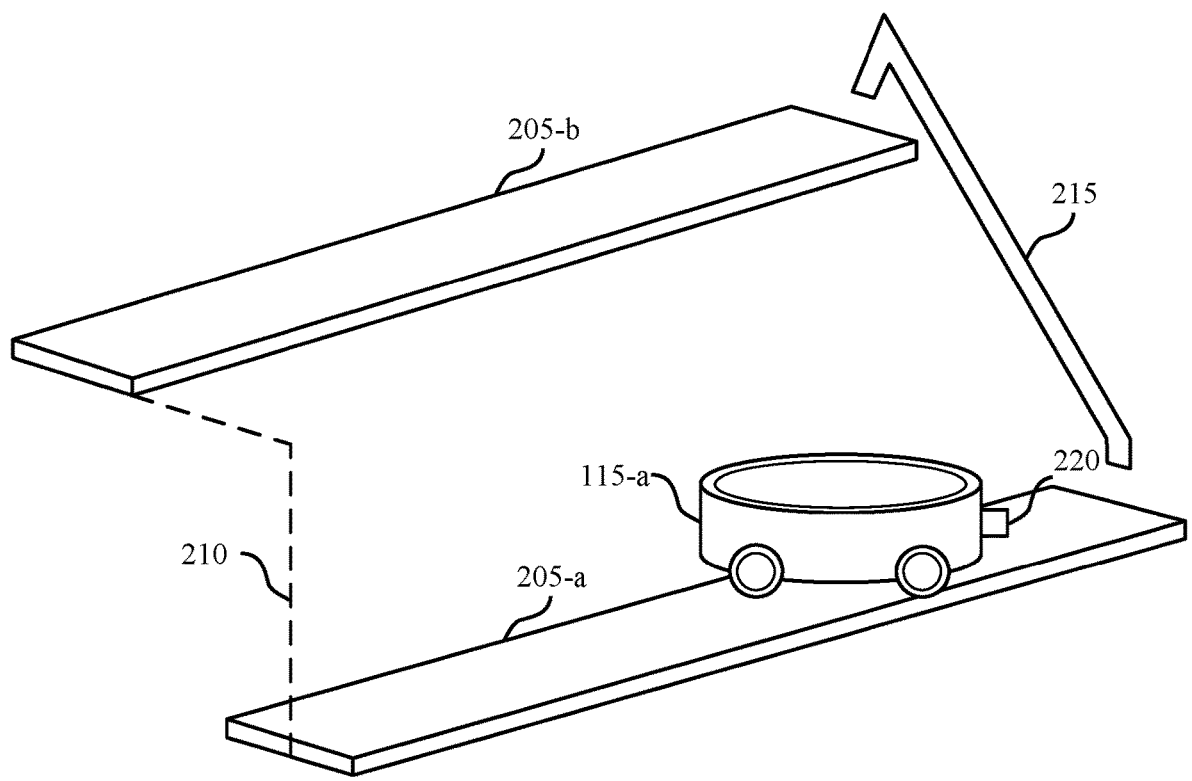
FIG. 2 illustrates an operating environment that supports robotic stair lifts in accordance with aspects of the present disclosure.

FIG. 2 illustrates an example of an operating environment 200 that supports robotic chair lifts in accordance with aspects of the present disclosure. The operating environment 200 includes a robotic device 115-a which may navigate surfaces 205. In some examples, operating environment 200 may be a home, an office, a staircase, or any other environment that includes one or more surfaces 205 that have different vertical positions. In some examples, robotic device 115-a may be an example of a ground-based device that moves across a surface 205 in a horizontal manner (e.g., a robotic vacuum). Surfaces 205 may be examples of hardwood floors, tile floors, carpeted floors, or any other surface on which robotic device 115-a may navigate.

In some examples, robotic device 105 may navigate surface 110-a according to the functionality of robotic device 105. For example, robotic device 105 may be a robotic vacuum cleaner such that robotic device 105 may navigate surface 110-a and remove debris (e.g., dust, sand, or dirt) from surface 110-a. The robotic device 115-a may be configured with mapping techniques allowing it to construct a map of its surroundings (e.g., the operating environment 200). In addition, the robotic device 115-a may be configured to localize itself within the map, and thereby support a degree of autonomy when performing functions within the operating environment 200. In some embodiments, the robotic device 115-a may identify a geo-boundary (e.g., a 2D and/or 3D geo-boundary) corresponding to the operating environment 200.

The operating environment 200 may be, in some examples, part of a structure, such as a residential or commercial building. For example, operating environment 200 may be a home and each surface 205 may be or include a room (e.g., bedroom, living room) including one or more access points (e.g., windows and/or doors) and objects (e.g., furniture, electronic devices) spread throughout the room. The geo-boundary may relate to the operating environment 200 and the robotic device 115-a may be configured to perform autonomous functions within the geo-boundary. For example, the robotic device 115-a may perform an autonomous debris collection process within the operating environment 200.

Operating environment 200 may include surface 205-b, which is vertically displaced from surface 205-a by vertical distance 210. Further, surface 205-a and surface 205-b may not be connected by a surface that can be navigated by robotic device 105 (e.g., a ramp). Thus, due to the mobility characteristics of robotic device 115-a (e.g., robotic device 115-a may move across a surface 205 in a horizontal manner), robotic device 115-a may be unable to access surface 205-b without external assistance. Therefore, the operational effectiveness of robotic device 115-a may be limited.

Operating environment 200 may include track 215 that connects surface 205-a and surface 205-b which robotic device 115-a may engage (e.g., via attachment component 220) and utilize to move between surface 205-a and 205-b. In some cases, robotic device 115-a may engage track 215 upon identifying the location of track 215. Robotic device 115-a may know the location of track 215. Additionally or alternatively, robotic device 115-a may be equipped with at least one spatial measurement device, such as an imaging sensor (e.g., a camera) which may assist in identifying the location of track 215. In some embodiments, the robotic device 115-a may be equipped with any of a number of additional sensors useful for SLAM and navigation, such as wheel/rotary encoders, a global navigation satellite system (GNSS) receiver (e.g., a Global Positioning System (GPS) receiver), an inertial measurement unit (IMU) or components thereof (e.g., accelerometer, gyroscope, magnetometer, etc.), an orientation sensor, and a monocular image sensor.

Robotic device 115-a may include attachment component 220, which may be utilized by robotic device 115-a to engage track 215. In some examples, attachment component 220 may be a magnet, a hook, a clamp, or any other device that may be utilized by robotic device 115-a to engage track 215. Upon arriving at the location of track 215 at a first surface 205 (e.g., surface 205-a), robotic device 115-a may engage track 215 using attachment component 220. After utilizing track 215 and arriving at a second surface 205 (e.g., surface 205-b), robotic device 115-a may disengage attachment component 220 from track 215 and begin navigating the second surface 205.

Robotic device 115-a may further include one or more components supporting horizontal and/or vertical movement such as an actuator, which may be utilized to move robotic device 115-a along track 215 (e.g., such that track 215 may function as a passive component of operating environment 200). In some examples, the actuator may be an electronic actuator, a hydraulic fluid actuator, a pneumatic actuator, or any other type of actuator that may be used by robotic device 115-a to move along track 215. Upon engaging track 215, robotic device 115-a may activate the actuator to move along the track 215. In some cases, the operation of the actuator may be based on the surface 205 at which robotic device 115-a engages track 215. For example, when engaging track 215 at surface 205-a to move to surface 205-b, the actuator may be configured to provide clockwise rotation to move robotic device 115-a from surface 205-a to surface 205-b along track 215. In another example, when engaging track 215 at surface 205-b to move to surface 205-a, the actuator may be configured to provide counterclockwise rotation to move robotic device 115-a from surface 205-b to surface 205-a along track 215.

Figure 3:
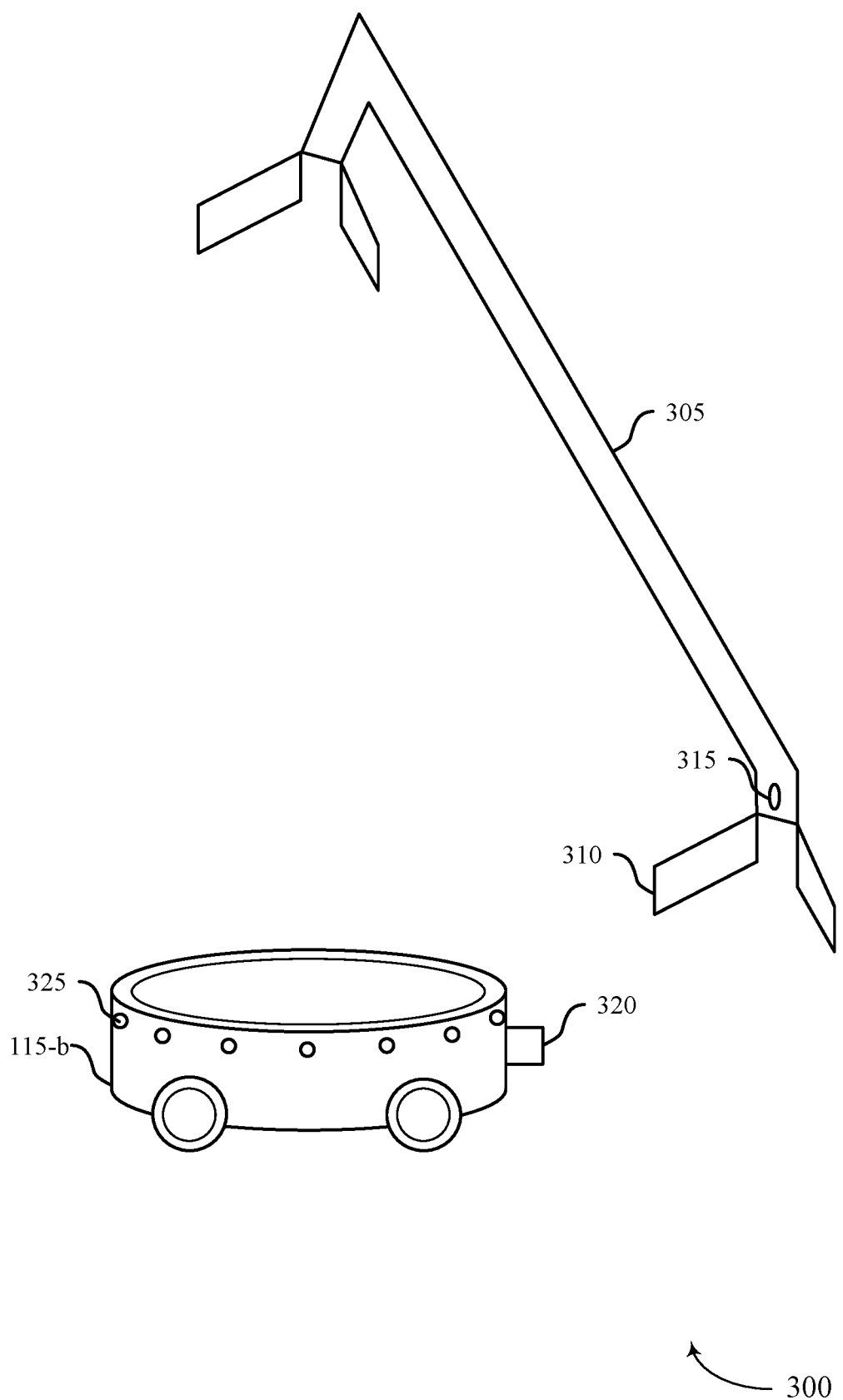
FIG. 3 illustrates a block diagram of a lifting system that supports robotic stair lifts in accordance with aspects of the present disclosure.

FIG. 3 illustrates a lifting system 300 that exemplifies robotic stair lifts in accordance with aspects of the present disclosure. Lifting system 300 may represent aspects of operating environment 200 as described with reference to FIG. 2. For example, lifting system 300 includes a robotic device 115-b and a track 305, each of which may be an example of the corresponding component described with reference to FIG. 2.

Robotic device 115-b may include sensors 325 and an attachment component 320 for coupling with track 305. For example, sensors 325 may assist robotic device 115-b in mapping a given surface and/or detecting a location of track 305. In some cases, the functionality of sensors 325 may be replaced by instructions (e.g., configured path information) such that robotic device 115-b may identify a geo-boundary without relying on sensors 325. Attachment component 320 may be a magnet, a hook, a clamp, or any other device that may be utilized by robotic device 115-b to engage track 305. In some cases, attachment component 320 may be or include an actuator for moving device 115-b along track 305.

Track 305 may include attachment receiver 315, which may act as a complementary structure to attachment component 320 (e.g., may be a magnet of opposite polarity, may be a receiver for a hook, etc.). For example, attachment receiver 315 may be mounted on an assembly able to translate along track 305. In some cases, attachment receiver 315 may represent a chain or the like and may move along an orbital path within track 305. Alternatively, attachment receiver 315 may translate along a static path (e.g., ridged grooves or the like).

In some cases, track 305 may include one or more funneling systems 310. For example, funneling system 310-a may assist robotic device 115-b in detecting a location of attachment receiver 315. For example, robotic device 115-b may be able to coarsely identify a location of track 305 but may be assisted by funneling systems 310 in locating attachment receiver 315 with sufficient accuracy to allow attachment component 320 to couple with attachment receiver 315. In some cases, the funneling system 310 may represent a physical structure (e.g., guides tapering towards attachment receiver). Additionally or alternatively, funneling system 310 may represent components of track 305 which support communications with sensors 325 (e.g., infrared reflectors, lights, etc.).

Figure 4:
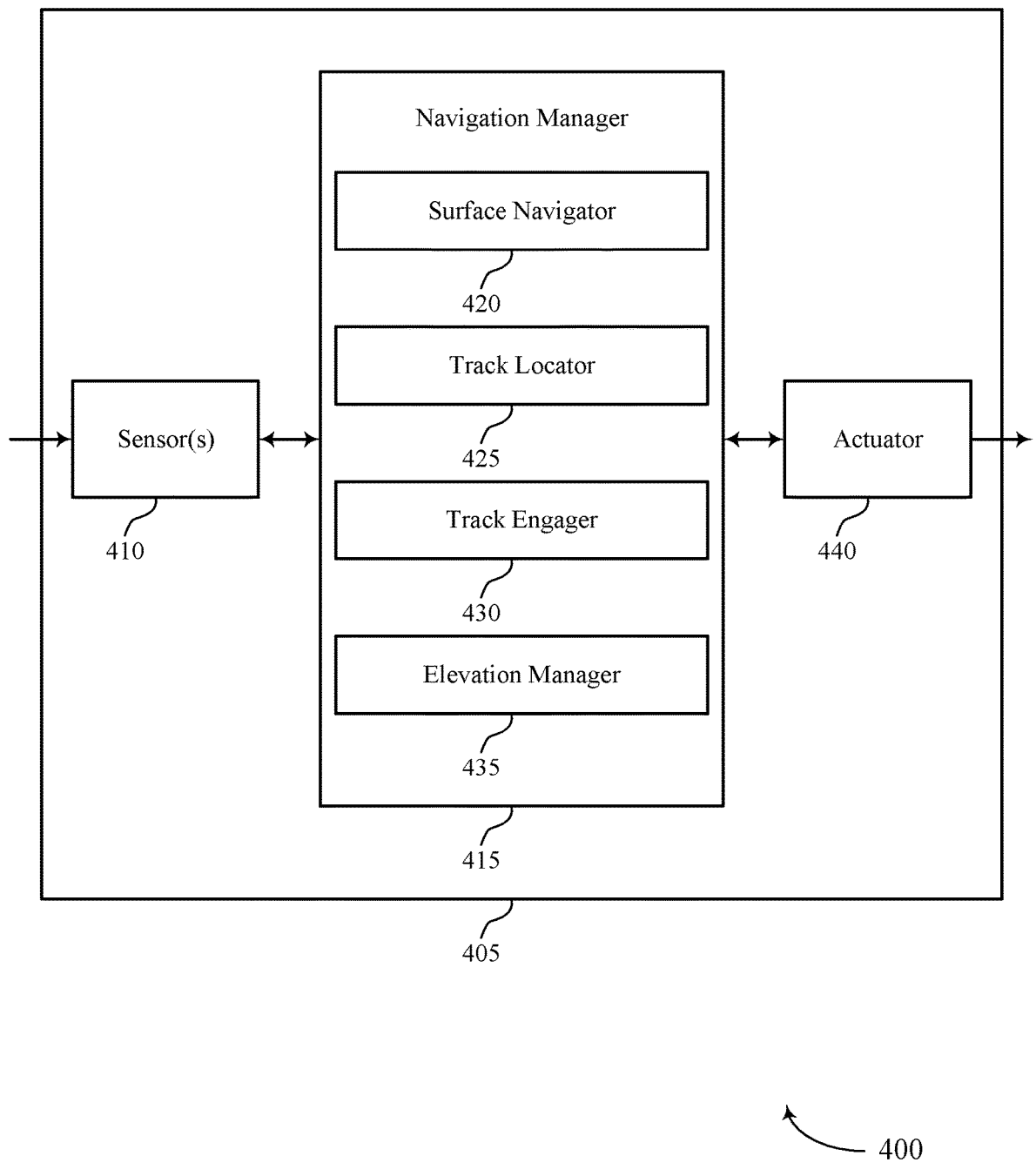
FIG. 4 shows a block diagram of a device that supports robotic stair lifts in accordance with aspects of the present disclosure.

FIG. 4 shows a block diagram 400 of a device 405 that supports robotic stair lifts in accordance with aspects of the present disclosure. The device 405 may be an example of a robotic device 115 as described above with reference to FIGS. 1, 2, and 3. The device 405 may include a sensor(s) 410, a navigation manager 415, and an actuator 440. The device 405 may also include a processor. Each of these components may be in communication with one another (e.g., via one or more buses).

The navigation manager 415 may be an example of aspects of the navigation manager 510 as described herein. The navigation manager 415 may include a surface navigator 420, a track locator 425, a track engager 430, and an elevation manager 435. Each of these modules may communicate, directly or indirectly, with one another (e.g., via one or more buses). The navigation manager 415, or its sub-components, may be implemented in hardware, code (e.g., software or firmware) executed by a processor, or any combination thereof. If implemented in code executed by a processor, the functions of the navigation manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The navigation manager 415, or its sub-components, may be physically located at various positions, including being distributed such that portions of functions are implemented at different physical locations by one or more physical components. In some examples, the navigation manager 415, or its sub-components, may be a separate and distinct component in accordance with various aspects of the present disclosure. In some examples, the navigation manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Device 405 may be equipped with at least one spatial measurement device (e.g., sensors 410), such as an imaging sensor (e.g., a camera). In some embodiments, device 405 may be equipped with any of a number of additional sensors useful for SLAM and navigation, such as wheel/rotary encoders, a GNSS receiver (e.g., a GPS receiver), an IMU or components thereof (e.g., accelerometer, gyroscope, magnetometer, etc.), an orientation sensor, and a monocular image sensor. In some cases, the one or more sensors 410 of the device include infrared beacons.

The surface navigator 420 may navigate a first surface and navigate the second surface. In some examples, the surface navigator 420 may remove debris from the first surface and/or the second surface. That is, surface navigator 420 may include or represent logic (e.g., digital circuitry) for navigating a surface (e.g., based on SLAM). In some cases, surface navigator 420 may include or represent logic controlling a debris removal operation (e.g., controlling hardware responsible for debris removal).

The track locator 425 may identify a location of a track that connects the first surface to a second surface that is vertically displaced from the first surface. In some examples, the track locator 425 may detect the location of the track using one or more sensors 410. In some examples, the track locator 425 may map the first surface, the second surface, or both using the one or more sensors 410. In some examples, the track locator 425 may determine a position of the device 405 on the first surface. In some examples, the track locator 425 may identify the location of the track relative to the position of the device 405.

The track engager 430 (e.g., which may alternatively be referred to as an attachment component) may engage the track based on the identified location. In some examples, the track engager 430 may engage a funneling system that guides the device 405 to the track. As such, track engager 430 may be a magnet, a hook, a clamp, or any other device that may be utilized by robotic device 115-*a* to engage track 215.

The elevation manager 435 may ascend to (e.g., or descend to) the second surface by activating an actuator 440. In some examples, the elevation manager 435 may ascend to a third surface that is vertically displaced from the first surface and the second surface by activating the actuator of the device. In some cases, actuator 440 includes an electronic actuator, a hydraulic fluid actuator, or a pneumatic actuator. Actuator 440 may represent a component of device 405 that is responsible for movement of device 405. For example, actuator 440 may operate based on a control signal (e.g., from navigation manager 415) and a source of energy (e.g., electric current, hydraulic fluid pressure, pneumatic pressure, etc.).

Figure 5:
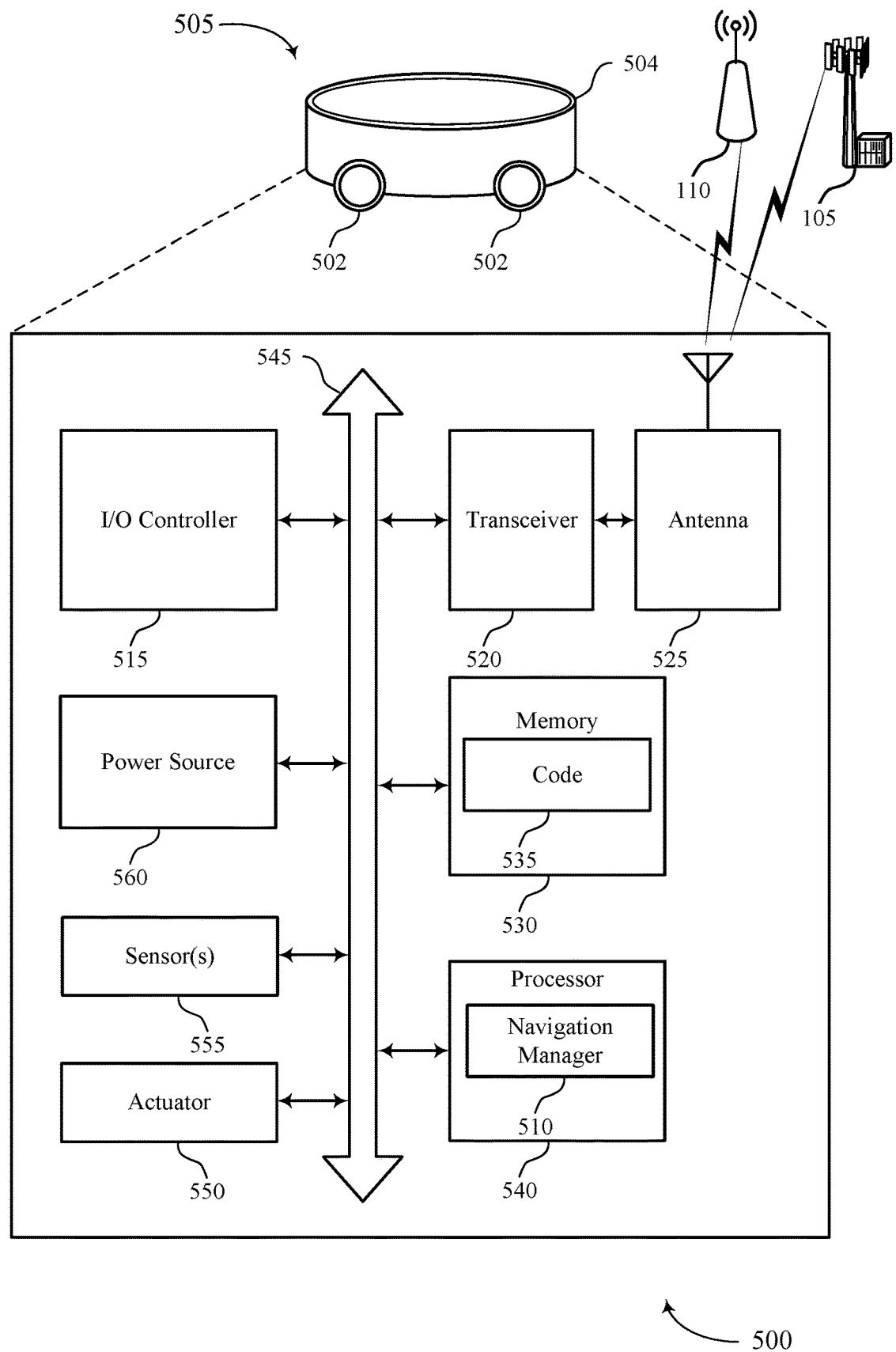
FIG. 5 shows a diagram of a system including a device that supports robotic stair lifts in accordance with aspects of the present disclosure.

FIG. 5 shows a diagram of a system 500 including a device 505 that supports robotic stair lifts in accordance with aspects of the present disclosure. The device 505 may be an example of or include the components of a robotic device as described herein. The device 505 may include a navigation manager 510, an I/O controller 515, a transceiver 520, an antenna 525, memory 530, a processor 540, an actuator 550, and a power source 560 (e.g., a battery or the like). These components may be in electronic communication via one or more buses (e.g., bus 545).

The device 505 may be a ground-based robotic device that may include a number of wheels 502 operated by corresponding motors to provide locomotion and a frame 504. The frame 504 may provide structural support for internal components (e.g., the I/O controller 515, the transceiver 520, the antenna 525, the memory 530, the processor 540, the sensor(s) 555, and the power source 560 of the device 505 as well as for the wheels 502). The device 505 illustrated in FIG. 5 is an example of a robotic vehicle that may utilize various locomotive techniques, but is not intended to imply or require that various embodiments are limited to ground robotic vehicles. For example, some examples of device 505 may include rotorcraft or winged robotic vehicles, waterborne robotic vehicles, and space-based robotic vehicles. For ease of description and illustration, some detailed aspects of the device 505 are omitted such as wiring, frame structure interconnects, or other features. While the illustrated device 505 includes one or more wheels 502, this is merely exemplary and various embodiments may include any variety of components to provide propulsion and maneuvering capabilities, such as treads, paddles, skids, or any combination thereof or of other components.

The navigation manager 510 may perform aspects of the operations described with reference to FIG. 4. For example, navigation manager 510 may navigate one or more surfaces (e.g., a first surface and a second surface that is vertically displaced from the first surface). The navigation manager 510 may identify a location of a track that connects the first surface to a second surface that is vertically displaced from the first surface. The navigation manager 510 may engage the track based on the identified location and ascend to the second surface by activating an actuator of the device 505.

In some cases, device 505 may include one or more components for debris removal. For example, device 505 may include a vacuum, a filter, or the like. Additionally or alternatively, device 505 may include one or more components supporting navigation of various surfaces (e.g., sensors 410 described with reference to FIG. 4).

The I/O controller 515 may manage input and output signals for the device 505. The I/O controller 515 may also manage peripherals not integrated into the device 505. In some cases, the I/O controller 515 may represent a physical connection or port to an external peripheral. In some cases, the I/O controller 515 may utilize an operating system such as iOS®, ANDROID®, MS-DOS®, MS-WINDOWS®, OS/2®, UNIX®, LINUX®, or another known operating system. In other cases, the I/O controller 515 may represent or interact with a modem, a keyboard, a mouse, a touchscreen, or a similar device. In some cases, the I/O controller 515 may be implemented as part of a processor. In some cases, a user may interact with the device 505 via the I/O controller 515 or via hardware components controlled by the I/O controller 515.

The transceiver 520 may communicate bi-directionally, via one or more antennas, wired, or wireless links as described above. For example, the transceiver 520 may represent a wireless transceiver and may communicate bi-directionally with another wireless transceiver. The transceiver 520 may also include a modem to modulate the packets and provide the modulated packets to the antennas for transmission, and to demodulate packets received from the antennas. In some cases, the wireless device may include a single antenna 525. However, in some cases the device may have more than one antenna 525, which may be capable of concurrently transmitting or receiving multiple wireless transmissions. For example, the device 505 may wirelessly communicate with access point 110 and/or base station 105 via the antenna 525, or another computing device (e.g., a beacon, a smartphone, a tablet).

The memory 530 may include RAM and ROM. The memory 530 may store computer-readable, computer-executable code 535 including instructions that, when executed, cause the processor to perform various functions described herein. In some cases, the memory 530 may contain, among other things, a BIOS which may control basic hardware or software operation such as the interaction with peripheral components or devices.

The processor 540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 540 may be configured to operate a memory array using a memory controller. In other cases, a memory controller may be integrated into the processor 540. The processor 540 may be configured to execute computer-readable instructions stored in a memory (e.g., the memory 530) to cause the device 505 to perform various functions (e.g., functions or tasks supporting robotic stair lifts). The navigation manager 510 may be coupled to the processor 540. In some cases, the processor 540 (e.g., or the navigation manager 510) may include a maneuvering data component that is configured to provide travel control-related information such as orientation, attitude, speed, heading, and similar information that the navigation manager 510 may use for navigation purposes.

The code 535 may include instructions to implement aspects of the present disclosure, including instructions to support navigation. The code 535 may be stored in a non-transitory computer-readable medium such as system memory or other type of memory. In some cases, the code 535 may not be directly executable by the processor 540 but may cause a computer (e.g., when compiled and executed) to perform functions described herein.

The sensor(s) 555 may be one or more sensors configured to conduct periodic or ongoing automatic measurements related to autonomous functions (e.g., SLAM). A single sensor 555 may be capable of sensing multiple parameters (e.g., weight, airflow pressure, GPS), or alternatively, separate sensors may monitor separate resource parameters. For example, one sensor 555 may measure temperature, while another sensor 555 (or, in some cases, the same sensor 555) may determine orientation. In some cases, one or more sensors 555 may additionally monitor alternate sensor parameters, such as audio, vibrations, and the like.

In some examples, the sensor 555 be an example of an IMU or a similar sensor (e.g., accelerometer, a gyroscope, etc.). The processor 540 may receive additional information from one or more sensors 555 (e.g., an optical sensor, a pneumatic sensor that may sense reduced airflow or suction, a camera sensor that may be a monocular camera) and/or other sensors. In some examples, the sensor(s) 555 may include one or more optical sensors capable of detecting infrared, ultraviolet, and/or other wavelengths of light. The sensor(s) 555 may also include at least one sensor that provides motion feedback to the processor 540, for example, a wheel sensor (e.g., one or more wheel/rotary encoders), a contact or pressure sensor configured to provide a signal indicating contact with a surface, etc. The sensor(s) 555 may also include one or more of a radio frequency (RF) sensor, a barometer, a sonar emitter/detector, a radar emitter/detector, a microphone or another acoustic sensor, or another sensor that may provide information usable by the processor 540 for movement operations as well as navigation and positioning calculations.

Figure 6:
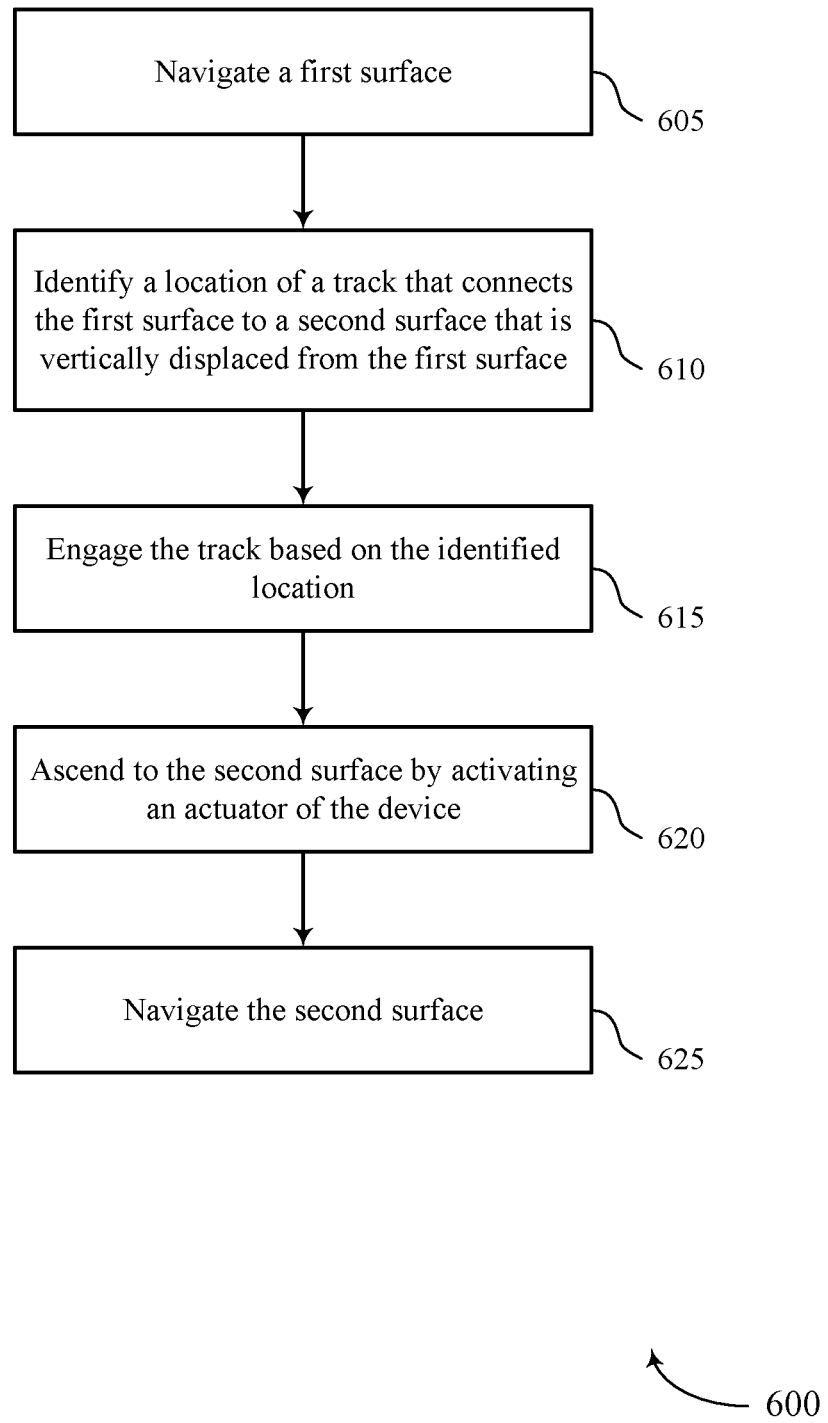
FIGS. 6 through 9 show flowcharts illustrating methods that support robotic stair lifts in accordance with aspects of the present disclosure.

FIG. 6 shows a flowchart illustrating a method 600 that supports robotic stair lifts in accordance with aspects of the present disclosure. The operations of method 600 may be implemented by a device or its components as described herein. For example, the operations of method 600 may be performed by a navigation manager as described with reference to FIGS. 4 and 5. In some examples, a device may execute a set of instructions to control the functional elements of the device to perform the functions described below. Additionally or alternatively, a device may perform aspects of the functions described below using special-purpose hardware.

At 605, the device may navigate a first surface. The operations of 605 may be performed according to the methods described herein. In some examples, aspects of the operations of 605 may be performed by a surface navigator as described with reference to FIG. 4.

At 610, the device may identify a location of a track that connects the first surface to a second surface that is vertically displaced from the first surface. The operations of 610 may be performed according to the methods described herein. In some examples, aspects of the operations of 610 may be performed by a track locator as described with reference to FIG. 4.

At 615, the device may engage the track based on the identified location. The operations of 615 may be performed according to the methods described herein. In some examples, aspects of the operations of 615 may be performed by a track engager as described with reference to FIG. 4.

At 620, the device may ascend to the second surface by activating an actuator of the device. The operations of 620 may be performed according to the methods described herein. In some examples, aspects of the operations of 620 may be performed by an elevation manager as described with reference to FIG. 4.

At 625, the device may navigate the second surface. The operations of 625 may be performed according to the methods described herein. In some examples, aspects of the operations of 625 may be performed by a surface navigator as described with reference to FIG. 4.

Figure 7:
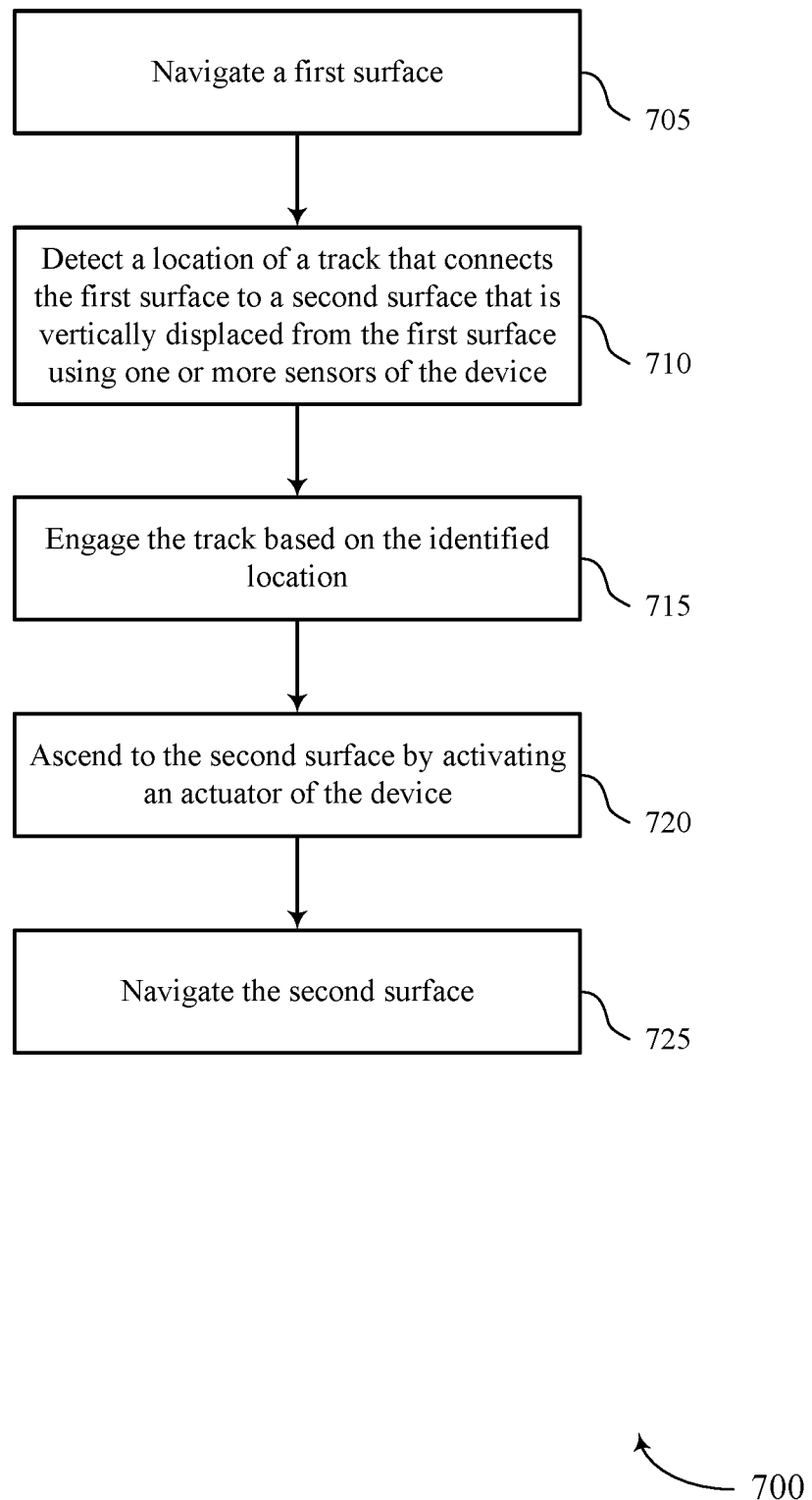

FIG. 7 shows a flowchart illustrating a method 700 that supports robotic stair lifts in accordance with aspects of the present disclosure. The operations of method 700 may be implemented by a device or its components as described herein. For example, the operations of method 700 may be performed by a navigation manager as described with reference to FIGS. 4 and 5. In some examples, a device may execute a set of instructions to control the functional elements of the device to perform the functions described below. Additionally or alternatively, a device may perform aspects of the functions described below using special-purpose hardware.

At 705, the device may navigate a first surface. The operations of 705 may be performed according to the methods described herein. In some examples, aspects of the operations of 705 may be performed by a surface navigator as described with reference to FIG. 4.

At 710, the device may detect a location of a track that connects the first surface to a second surface that is vertically displaced from the first surface using one or more sensors of the device. The operations of 710 may be performed according to the methods described herein. In some examples, aspects of the operations of 710 may be performed by a track locator as described with reference to FIG. 4.

At 715, the device may engage the track based on the identified location. The operations of 715 may be performed according to the methods described herein. In some examples, aspects of the operations of 715 may be performed by a track engager as described with reference to FIG. 4.

At 720, the device may ascend to the second surface by activating an actuator of the device. The operations of 720 may be performed according to the methods described herein. In some examples, aspects of the operations of 720 may be performed by an elevation manager as described with reference to FIG. 4.

At 725, the device may navigate the second surface. The operations of 725 may be performed according to the methods described herein. In some examples, aspects of the operations of 725 may be performed by a surface navigator as described with reference to FIG. 4.

Figure 8:
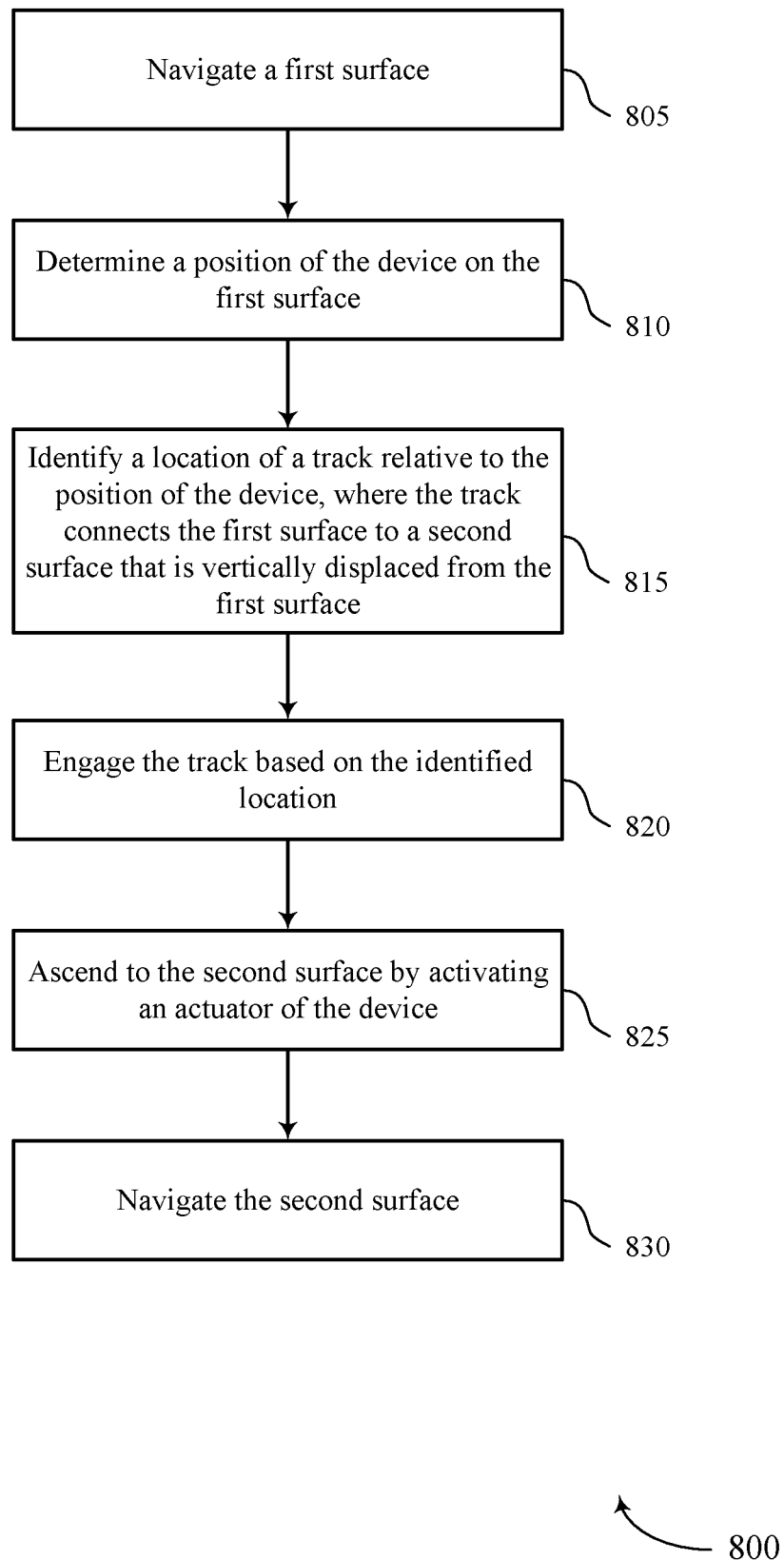

FIG. 8 shows a flowchart illustrating a method 800 that supports robotic stair lifts in accordance with aspects of the present disclosure. The operations of method 800 may be implemented by a device or its components as described herein. For example, the operations of method 800 may be performed by a navigation manager as described with reference to FIGS. 4 and 5. In some examples, a device may execute a set of instructions to control the functional elements of the device to perform the functions described below. Additionally or alternatively, a device may perform aspects of the functions described below using special-purpose hardware.

At 805, the device may navigate a first surface. The operations of 805 may be performed according to the methods described herein. In some examples, aspects of the operations of 805 may be performed by a surface navigator as described with reference to FIG. 4.

At 810, the device may determine a position of the device on the first surface. The operations of 810 may be performed according to the methods described herein. In some examples, aspects of the operations of 810 may be performed by a track locator as described with reference to FIG. 4.

At 815, the device may identify a location of a track relative to the position of the device, where the track connects the first surface to a second surface that is vertically displaced from the first surface. The operations of 815 may be performed according to the methods described herein. In some examples, aspects of the operations of 815 may be performed by a track locator as described with reference to FIG. 4.

At 820, the device may engage the track based on the identified location. The operations of 820 may be performed according to the methods described herein. In some examples, aspects of the operations of 820 may be performed by a track engager as described with reference to FIG. 4.

At 825, the device may ascend to the second surface by activating an actuator of the device. The operations of 825 may be performed according to the methods described herein. In some examples, aspects of the operations of 825 may be performed by an elevation manager as described with reference to FIG. 4.

At 830, the device may navigate the second surface. The operations of 830 may be performed according to the methods described herein. In some examples, aspects of the operations of 830 may be performed by a surface navigator as described with reference to FIG. 4

Figure 9:
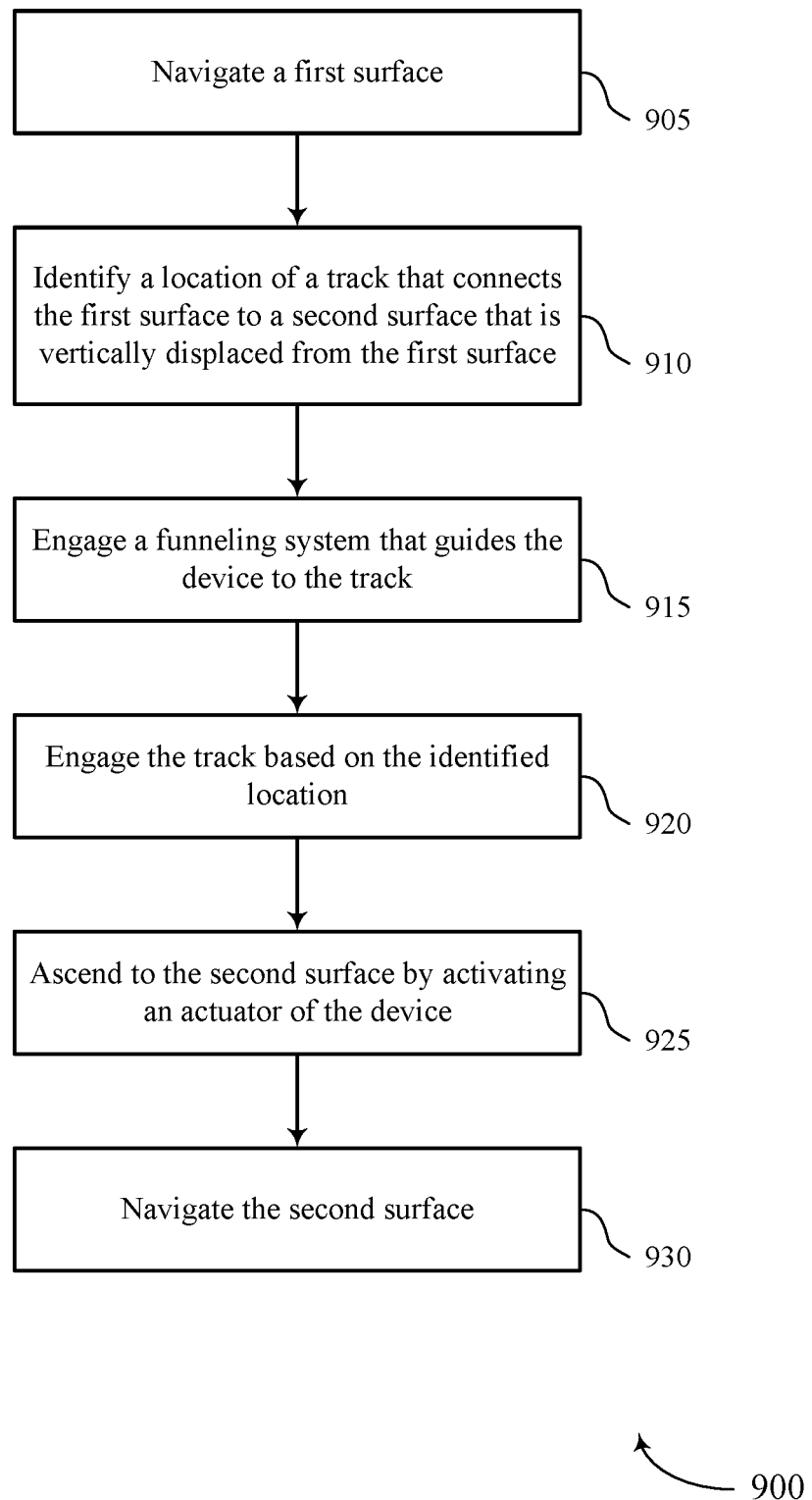

FIG. 9 shows a flowchart illustrating a method 900 that supports robotic stair lifts in accordance with aspects of the present disclosure. The operations of method 900 may be implemented by a device or its components as described herein. For example, the operations of method 900 may be performed by a navigation manager as described with reference to FIGS. 4 and 5. In some examples, a device may execute a set of instructions to control the functional elements of the device to perform the functions described below. Additionally or alternatively, a device may perform aspects of the functions described below using special-purpose hardware.

At 905, the device may navigate a first surface. The operations of 905 may be performed according to the methods described herein. In some examples, aspects of the operations of 905 may be performed by a surface navigator as described with reference to FIG. 4.

At 910, the device may identify a location of a track that connects the first surface to a second surface that is vertically displaced from the first surface. The operations of 910 may be performed according to the methods described herein. In some examples, aspects of the operations of 910 may be performed by a track locator as described with reference to FIG. 4.

At 915, the device may engage a funneling system that guides the device to the track. The operations of 915 may be performed according to the methods described herein. In some examples, aspects of the operations of 915 may be performed by a track engager as described with reference to FIG. 4.

At 920, the device may engage the track based on the identified location. The operations of 920 may be performed according to the methods described herein. In some examples, aspects of the operations of 920 may be performed by a track engager as described with reference to FIG. 4.

At 925, the device may ascend to the second surface by activating an actuator of the device. The operations of 925 may be performed according to the methods described herein. In some examples, aspects of the operations of 925 may be performed by an elevation manager as described with reference to FIG. 4.

At 930, the device may navigate the second surface. The operations of 930 may be performed according to the methods described herein. In some examples, aspects of the operations of 930 may be performed by a surface navigator as described with reference to FIG. 4.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for navigation of a device using a processor, comprising
    navigating, using the processor, a first surface;
    identifying, using the processor, a location of a track that connects the first surface to a second surface that is vertically displaced from the first surface;
    engaging, using the processor, the track based at least in part on the identified location;
    ascending, using the processor, to the second surface by activating an actuator of the device; and
    navigating, using the processor, the second surface.

2. The method of claim 1, wherein identifying, using the processor, the location of the track comprises:
    detecting the location of the track using one or more sensors of the device.

3. The method of claim 2, wherein the one or more sensors of the device comprise infrared beacons.

4. The method of claim 2, further comprising:
    mapping the first surface, the second surface, or both using the one or more sensors.

5. The method of claim 1, wherein identifying, using the processor, the location of the track comprises:
    determining a position of the device on the first surface; and
    identifying the location of the track relative to the position of the device.

6. The method of claim 1, wherein navigating, using the processor, the first surface comprises:
    removing debris from the first surface.

7. The method of claim 1, wherein the track connects the second surface to a third surface that is vertically displaced from the first surface and the second surface, the method further comprising:
    ascending to the third surface by activating the actuator of the device.

8. The method of claim 1, wherein the actuator comprises an electronic actuator, a hydraulic fluid actuator, or a pneumatic actuator.

9. The method of claim 1, wherein identifying, using the processor, the track comprises:
    engaging a funneling system that guides the device to the track.

10. An apparatus for navigation, comprising:
    a processor,
    memory in electronic communication with the processor; and
    instructions stored in the memory and executable by the processor to cause the apparatus to:
        navigate a first surface;
        identify a location of a track that connects the first surface to a second surface that is vertically displaced from the first surface;
        engage the track based at least in part on the identified location;
        ascend to the second surface by activating an actuator of the apparatus; and
        navigate the second surface.

11. The apparatus of claim 10, wherein the instructions to identify the location of the track are executable by the processor to cause the apparatus to:
   detect the location of the track using one or more sensors of the apparatus.

12. The apparatus of claim 11, wherein the instructions are further executable by the processor to cause the apparatus to:
   map the first surface, the second surface, or both using the one or more sensors.

13. The apparatus of claim 10, wherein the instructions to identify the location of the track are executable by the processor to cause the apparatus to:
   determine a position of the device on the first surface; and
   identify the location of the track relative to the position of the apparatus.

14. The apparatus of claim 10, wherein the instructions to navigate the first surface are executable by the processor to cause the apparatus to:
   remove debris from the first surface.

15. The apparatus of claim 11, wherein the one or more sensors of the apparatus comprise infrared beacons.

16. The apparatus of claim 10, wherein the actuator comprises an electronic actuator, a hydraulic fluid actuator, or a pneumatic actuator.

17. The apparatus of claim 10, wherein the track connects the second surface to a third surface that is vertically displaced from the first surface and the second surface.

18. The apparatus of claim 17, wherein the instructions to identify the location of the track are executable by the processor to cause the apparatus to:
   ascend to the third surface by activating the actuator of the apparatus.

19. The apparatus of claim 10, wherein the one or more sensors of the apparatus comprise an inertial measurement unit, an accelerometer, a gyroscope, a magnetometer, or a monocular image sensor, or a combination thereof.

20. The apparatus of claim 10, wherein the instructions to engage the track are executable by the processor to cause the apparatus to:
   engage a funneling system that guides the apparatus to the track.

* * * * *